United States Patent [19]

Overbergh et al.

[11] Patent Number: 4,689,474
[45] Date of Patent: Aug. 25, 1987

[54] ELECTRICALLY HEAT-RECOVERABLE SLEEVE

[75] Inventors: Noel M. M. Overbergh, Bertem; Jan Vansant, Leuven, both of Belgium

[73] Assignee: N.V. Raychem S.A., Belgium

[21] Appl. No.: 918,640

[22] Filed: Oct. 15, 1986

Related U.S. Application Data

[63] Continuation of Ser. No. 614,405, May 24, 1984, abandoned.

[30] Foreign Application Priority Data

May 26, 1983 [GB] United Kingdom ............... 8314651

[51] Int. Cl.$^4$ .............................................. H05B 3/34
[52] U.S. Cl. .................................. 219/528; 219/505; 219/549; 156/85; 174/DIG. 8
[58] Field of Search ............... 174/DIG. 8, 92, 68 A, 174/73 R, 73 SC; 219/528, 505, 535, 548, 249, 553; 156/49, 85, 86, 275; 264/230, 342 R; 252/516; 338/214; 403/341

[56] References Cited

U.S. PATENT DOCUMENTS

| | | | |
|---|---|---|---|
| 3,950,604 | 4/1976 | Penneck | 174/DIG. 8 X |
| 4,085,286 | 4/1978 | Horsma et al. | 174/92 |
| 4,236,949 | 12/1980 | Horsma et al. | 264/230 X |
| 4,276,909 | 7/1981 | Biscop | 138/167 |
| 4,298,415 | 11/1981 | Nolf | 156/85 |
| 4,304,616 | 12/1981 | Richardson | 156/86 |
| 4,410,379 | 10/1983 | Franckx | 156/54 |
| 4,413,922 | 11/1983 | Nolf | 403/341 |
| 4,421,582 | 12/1983 | Horsma et al. | 156/86 |
| 4,468,536 | 8/1984 | Van Noten | 174/92 |
| 4,472,222 | 9/1984 | Moisson et al. | 156/86 |

FOREIGN PATENT DOCUMENTS

| | | |
|---|---|---|
| 0025691 | 3/1981 | European Pat. Off. . |
| 3023840A | 1/1982 | Fed. Rep. of Germany . |
| 2412919 | 7/1979 | France . |

Primary Examiner—E. A. Goldberg
Assistant Examiner—Marvin M. Lateef
Attorney, Agent, or Firm—Ira D. Blecker

[57] ABSTRACT

A branch-off between telecommunications cables (5) may be sealed by means of an electrically heat-recoverable sleeve (1) and a branch-off clip (2) which holds together circumferentially spaced portions of the sleeve (1) between the branching cables (5). The clip (2) has an inner leg of heat-activatable sealing material which in use is positioned in the sleeve (1) between the cables (5). The sealing material is activated by the heat generated in the sleeve (1) during recovery.

17 Claims, 13 Drawing Figures

Fig. 1.

PRIOR ART

ELECTRICALLY HEAT-RECOVERABLE SLEEVE

This application is a continuation of application Ser. No. 614,405, filed May 24, 1984 now abandoned.

FIELD OF THE INVENTION

The present invention relates to the sealing of branch-offs using heat recoverable articles.

BACKGROUND OF THE INVENTION

Recoverable articles have found wide use for environmental sealing because of the ease with which they can be installed, the strength of seal that can be obtained, and the wide range of size of substrates with which any one design can be used. Recovery can be initiated by various means, although heat-recovery is at present preferred since heat-recoverable products are simple to produce and do not require specialized equipment to install. The article is simply placed over the substrate to be protected and heated which causes it to recover, generally by shrinking, into close conformity with the substrate.

A heat-recoverable article (an article the dimensional configuration of which may be made substantially to change when subjected to heat treatment) usually will recover towards an original shape from which it has previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962 the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat No. 1,440,524, equivalent to U.S. Pat. No. 4,035,534 an elastomeric member such as an outer tubular member is held in a stretched state by a second member, such as an inner tubular member, which, upon heating weakens and thus allows the elastomeric member to recover.

Heat recoverable wrap-around or tubular articles, referred to generally as sleeves although they may be more complex than simple cylinders and may have some closed ends, have been successfully involved in many fields of applications. However, problems may arise when two or more substrates such as supply lines, for example cables or pipes, have to be sealed at one position. This problem, which is known as branch-off, may occur for example at the outlet of a heat-recoverable article. Amongst areas where this problem is typically encountered there may especially be mentioned outlets of telecommunications splice cases, and feed-through devices.

One effective solution to the problem of branch-off has been to use moulded heat-shrinkable articles provided with preformed outlets for individual supply lines. However, in general such outlets have to be made to suit a specific application, and since they are expensive their use has not been widespread.

A less expensive solution is to use mastic tape to seal the gap between the supply lines so that on recovery of the heat recoverable article a proper encapsulation is formed. However, use of such tape requires skill and the method is not applicable to large branch-offs.

The problem was overcome by the surprising discovery that an effective branch-off at the end of a heat-recoverable article can be obtained by forming the individual outlets by means of a suitably shaped clip. This technique is disclosed in UK Pat. No. 2019120, equivalent to U.S. Pat. No. 4,298,415, which claims a method of forming a branch-off seal between a heat-shrinkable sleeve and at least two substrates, which comprises the steps of:

(a) positioning a clip having at least two elongate legs on the heat-shrinkable sleeve at an open end thereof with at least two of said legs being positioned externally of the sleeve so as to form at least two terminal conduits;

(b) positioning the substrates within the conduits; and (c) applying heat so as to effect shrinkage and to form the desired seal.

Excellent results have been achieved using this technique, high performance seals being easily produced from a small inventory. For certain branch-off configurations and where the seal is likely to be subjected to high pressure it has been found desirable to provide a sealing material such as a hot-melt adhesive in the crutch region between the diverging substrates and the surrounding recoverable sleeve. The above-mentioned patent also describes and claims use of a clip having three legs, where the outer legs perform the clipping function and an inner leg serves to deliver adhesive to the crutch region. When this adhesive is heat-activated (for example by melting in the case of a hot-melt adhesive) a particularly good branch-off seal is formed. By far the most widely used technique for causing heat-recovery of the sleeve is a torch, and this can usefully also be used to activate the adhesive in the crutch region: heat can flow by conduction from the outer legs of the clip (which are exposed to the torch) to the adhesive at the inner leg, particularly if the inner leg includes a heat conductor in thermal contact with the outer legs.

Offenlegungsschrift No. 3105471 relates to the same technique of forming a branch-off between cables using a clip. In one embodiment, the clip is essentially u-shaped and has injection moulded to the bridge portion a hot-melt adhesive which is intended to provide a seal in the crutch region. No means is provided for activating this inner leg of adhesive and a good seal is likely to be difficult to achieve. This is because heat conducted from the outer legs will cause adhesive at the bridge portion to melt and flow at least to some extent thus prematurely breaking the heat path to the remainder of the adhesive. The clip is said to be designed to prevent heat damage to the cables at all costs.

SUMMARY OF THE INVENTION

We have discovered that an excellent branch-off seal can be produced by using a clip having an inner leg of a sealant material if an electrically heat recoverable sleeve is used. This obviates the need for a rigid metal member running the length of the inner leg of sealant material.

The present invention therefore provides an assembly for forming a branch-off seal, which comprises: an electrically heat-recoverable sleeve; and a clip which can be positioned at an end of the sleeve so as to form at least two terminal conduits therein, the clip comprising an inner leg of a heat-activatable sealing material and two outer legs.

The invention also provides a method of forming a branch-off seal between an electrically heat-recoverable sleeve and at least two substrates, which comprises:

(a) positioning a clip having an inner leg of a heat-activatable sealing material and two outer legs on the sleeve with the outer legs outside the sleeve and the inner leg within the sleeve, so as to form at least two terminal conduits in the sleeve;

(b) positioning the substrates within the conduits; and (c) connecting the sleeve to electrical power to cause the sleeve to recover and the inner leg to become heat-activated.

The above steps (a) and (b) may be carried out in either order. In general, however, the sleeve will first be installed around the substrates, the clip then positioned on the sleeve, electrical connection made between the sleeve and a power supply, and the power turned on.

Electrical heating is able to heat the adhesive or other sealing material directly, thus avoiding the need for a heat path from the outer legs of the clip through the body of the adhesive. It is an advantage too that heat is generated within the sleeve and does not therefore have to pass through it. A further point is that heating can be controlled and uniform over the majority of the surface of the adhesive.

The sleeve may be a simple cylindrical article or it may have other shapes or form part of a larger article. It may be tubular or, where the substrates to be sealed have inaccessable ends or where space for installation is limited, it may be of the wrap-around type. A wrap-around sleeve is simply a sleeve which can be installed around a substrate with no free end, and then secured in the wrapped around configuration. The sleeve may be provided with closure members adjacent opposing edges, which interlock or which are held together by a further member.

Systems for electrical heating of recoverable sleeves can be classified as two general types: firstly, an electrical heater can be secured in thermal contact with a recoverable sleeve, and secondly the material of the sleeve may itself constitute part of the electrical circuit. In the first of these types electrical heating wires or sheet may be bonded to or embedded in the sleeve so that the sleeve becomes hot simply through conduction.

Preferred heaters for use in conjunction with heat-recoverable sleeves are disclosed in U.S. Pat. No. 4,177,446. These heaters comprise a laminate of a conductive polymer sheet (preferably a PTC conductive polymer sheet) and two laminar electrodes, with apertures passing through the laminate so that it can be easily deformed. It has also been reported that a conventional heating wire can be secured to a heat-recoverable sleeve, and one particular embodiment of this arrangement is disclosed in published European Patent Application No. 38659 to UBE Industries Ltd. A heat-shrinkable cover sheet has branched tongue-like portions at its end, which can slot and bond together. The ends of the sheet and the central part are separately provided with electrical heating wires arranged in a zig-zag pattern. The wires simply terminate at the edge of the sheet for connection to a power source.

The second type mentioned above employs a special recoverable sleeve which itself has the ability to become hot when subjected to electrical power. The requirement here is for a material which is electrically resistive, is capable of being made heat-recoverable, and is flexible. Conductive polymers, such as those made by loading polyolefins with carbon black, have these characteristics and can be made self-regulating by proper choice of the carbon content. Self-regulation results from the material having a positive temperature coeficient of resistance (PTC) so that when the material reaches a certain temperature its electrical resistance rises, thus sharply cutting off power input and preventing further heating. This feature is of great benefit since it allows simple power supplies without thermostats or other controls to be used and it makes installation of the sleeve less craft-sensitive. The heating characteristics may be improved by combining a layer of PTC material with a layer of constant wattage (CW) material in such a way that current flows through both: this can lead to reduced current in-rush on initial connection of the power, and to a greater heating capacity. For a fuller description of preferred recoverable sleeves of this type, reference should be made to UK Pat. Nos. 1562086 and 2012149, together equivalent to U.S. Pat. No. 4,421,582, and the documents referred to therein.

Our copending U.S. patent application Ser. No. 584,045 filed Feb. 27, 1984 discloses a wraparound heat-recoverable sleeve having electrical heating means, and closure members which can be secured together to maintain the sleeve in a wraparound configuration and through which the heating means can be powered. The closure members preferably provide means whereby incoming power is distributed to a sheet electrode lying in or on the material of the sleeve. More preferably, the closure members provide conductors running substantially the length of the sleeve.

The use of widely and uniformly distributed power for shrinking a sleeve has been found to be able to provide an unexpected advantage in addition to that of providing good branch-off sealing when using a clip having an inner leg of sealing material. We have found that it is possible to achieve quick heating and therefore quick recovery since much energy can safely be employed at low current densities, and that this can still result in a rather quicker recovery at the centre of the sleeve than at its ends. This is of advantage since air is progressively driven out from between the substrate and the sleeve as the sleeve recovers. Furthermore any adhesive coating on the surface of the sleeve is squeezed or rolled onto the substrate as recovery progresses from the centre of the sleeve outwards. The reason for this progressive recovery is not fully understood.

This effect can be enhanced or overcome or other form of programmed recovery can be brought about by suitable design of the heating means and closure members. For example, the resistivity of any conductors comprising the closure members, or of any heater material or electrode can be varied along the length of the sleeve, to cause a non-uniform rate of heating at different parts of the sleeve. Instead of a variation in resistivity, localised insulation can be provided.

The closure members referred to may be first and second closure members positioned respectively adjacent opposing edge portions of the sleeve. These closure members (through which the power is supplied) may interlock, or be held towards one another by a third member which does not participate in the electrical circuit.

An alternative arrangement is where first and second closure members at adjacent opposing edge portions of the sleeve are held by a third member, power being supplied by applying a potential difference between the third member and either of the first and second members.

This can be varied slightly by additionally connecting the other of the first and second members to either side of the power supply.

Current may be arranged to flow in the plane of a conductive recoverable sleeve either circumferentially, axially of the sleeve, or perpendicular to that plane namely though the thickness of the material of the sleeve. Where the sleeve is simply heated by conduction from a separate electrical circuit the current path will generally be in the plane of the sleeve.

The preferred direction of current flow through the thickness of the sheet material constituting the sleeve will be produced in a laminate comprising a recoverable conductive polymeric material between two sheet electrodes. An insulating layer may be provided on the exposed surface of each electrode. It is necessary that the electrodes be in good electrical contact with the conductive polymeric sheet over that period when heating is required and this will generally require continued physical contact during at least some of the recovery cycle. Some means should be provided whereby the electrode can change its size or shape to follow the change in the recovering sheet. A preferred method is to produce an electrode having the size and shape required after recovery, to produce an array of slits in the electrode, and then to expand the electrode to correspond to the pre-recovery size of the sleeve. An alternative technique is to form each electrode as a highly perforate metal sheet, especially with diamond-shaped holes, which can easily distort on recovery. Contact between the closure members and the electrodes can be made by localised removal of any insulating layer at the regions of the sheet where the closure members are to be provided. The various components of the laminate may be bonded together with an adhesive, for example a pressure-sensitive adhesive or a hot-melt adhesive. Where a hot-melt or similar adhesive is used, the temperature at which the adhesive begins to fail should of course be chosen depending on the recovery temperature of the sheet.

Where the current is to run substantially parallel to the recoverable sheet, whether or not the sheet is part of the circuit, the electrodes may be in wire or strip form. The electrodes are preferably part of the closure members or constitute the whole of the closure members, and they may be attached to a surface of the sheet or embedded in the sheet. Where the electrodes are on the surface of a conductive polymeric sheet, they may be positioned on opposite surfaces and spaced apart thus producing a diagonal current path.

If the sheet is part of the circuit, the electrodes may be positioned spaced apart a suitable distance to apply voltage to the sheet. It is preferred that the closure members constitute the electrodes, and in such a case the current path will be circumferential through the whole width of the sleeve. Some insulation will generally be required between the opposing edge portions of the sheet which are brought together on installation in order to prevent a short from one closure member to another.

Where the sheet is not part of the heating circuit, some form of discrete heater must be applied. Such a discrete heater may be a metal resistance wire, metal resistance sheet or may be a conductive polymer heater. In each of these cases it will be desirable to ensure that the heater can alter its size or shape to follow the change in the recovering sheet. This requirement was mentioned above in connection with the sheet electrode for a recoverable conductive polymeric material. In the case of a sheet heater, the solution given above for the sheet electrode is preferred. Where the heater is a wire it can simply be arranged to follow a path such as a ziz-zag that can collapse as the sleeve recovers, and where the heater is a polymeric material it can be made recoverable to a similar exent to the recoverable sleeve to be installed.

A preferred discrete sheet heater is disclosed in U.S. Pat. No. 4,177,446 to Diaz. This heater is a composite formed of a conductive polymer composition in sheet form, powered via two sheet electrodes arranged one either side of the polymer composition so that the current path is through its thickness. Such a composite heater may be provided in thermal contact with the recoverable sleeve, for example by bonding it to the inner surface of the sleeve, to an outer surface or to both. The heater need not extend over the entire surface of the sleeve, although it is preferred that it extends substantially over the whole of the part that is to be recovered.

In order that the heater be able to follow the change in shape of the recoverable sleeve to which it is attached, it is preferably provided with apertures capable of changing shape so as to accomodate a change in a planar dimension of at least 30%, more preferably at least 100%. The heater may be manufactured by laminating together the conductive polymer and the electrodes, providing a series of slits through the laminate, and then stretching the laminate so that the slits open out into, for example, diamond-shaped apertures. Such a heater may be used with a shrinkable sleeve, since shrinkage of the heater can occur by closing of the diamond-shaped apertures. Alternatively, the sleeve could be formed with wide apertures and compressed before use.

This type of heater preferably comprises: (a) a laminar member composed of a material which comprises an organic polymer and electrically conductive particles dispersed in the polymer in amount sufficient to render the member electrically conductive; (b) a pair of laminar flexible electrodes which (i) are connected (directly or indirectly) to opposite faces of said laminar member; and (ii) are substantially coplanar with said laminar member; and (iii) are adapted to be connected to an external source of power to cause current to pass through said laminar member; said laminar member and laminar electrodes having a plurality of apertures through the thickness thereof, the apertures being of a size, shape and distribution which permit at least one of the dimensions of the element in the plane thereof to be changed by a change in shape of the apertures.

The conductive polymer component of the heater preferably exhibits PTC (positive temperature coeficient) behaviour ie, a rapid increase in resistivity at a particular temperature or over a particular temperature range (generally known as the switching temperature $T_s$). This means that the polymer composition is converted from an electrical conductor to an electrical insulator over a relatively limited increase in temperature, thus preventing the heater from attaining a temperature greater than its switching temperature. This provides the automatic control mentioned above as a desirable feature.

In a modification, component (a) of this type of heater may comprise a PTC material and at least one intermediate layer which: (a) exhibits constant wattage behaviour at a temperature below $T_s$ of the PTC material (by which we mean that it undergoes an increase in resistance of less than six-fold in any 30° C. range below $T_s$);(b) is composed of a material which comprises an organic polymer and electrically conductive particles dispersed in the polymer in amount sufficient to render the member electrically conductive; (c) has a resistivity greater than 10 ohm cm; and (d) is interposed between the PTC material and an electrode. The constant wattage layer can improve the electrical performance of the heater by reducing current inrush, as was mentioned above in connection with self-heating recoverable sleeves.

Although control for the heater could be provided as part of the power supply rather than part of the sleeve or as part of the sleeve but distinct from the heater, it has been found desirable for the sleeve to be self-regulating over its whole surface since this allows simple, widely available power supplies to be used, and ensures that the control is always correctly matched. The self-regulation possible with conductive polymers mentioned above is preferably a feature of the sleeves of the present invention. Recovery of the sleeve becomes extremely simple since all that has to be done is to connect it to a power supply (which may merely be a battery) and wait until recovery can be seen to be complete, or until the sealing material of the clip has reached its desired temperature. Also, if there is any sealing material on the surface of the sleeve one should ensure that it is properly activated.

In a preferred embodiment of the invention, the heater itself, or each electrode which supplies power to a recoverable polymeric sleeve, is in sheet form; and the closure members distribute power from a cable from the power supply to these sheets. The closure members run lengthwise of the sleeve and make electrical contact with the heater or electrodes along substantially the entire length of the sleeve. In such a system where the sleeve is a laminate of electrodes and recoverable conductive polymeric material a preferred way of making the closure members is to wrap each longitudinal edge portion of the recoverable material around a rod or other elongate conductor. Both edge portions are wrapped the same way (say clockwise) around the conductors so that one conductor contacts an electrode on one surface of the recoverable material and the other conductor contact an electrode on the other surface. The two resulting closure members may be held together to maintain the sleeve in a wrap-around configuration by a third member which does not form part of the electrical circuit. It can be seen that the application of a potential difference between the two closure members will result in passage of current through the thickness of the recoverable sleeve.

The clip perferably comprises two outer legs connected by a bridge portion, and an inner leg of sealing material bonded to or mechanically fixed to the bridge portion. The outer legs and the bridge portion are preferably integral and formed from a rigid material such as metal or a polymeric material for example a glass-filled polyamide. The clip may, however, be formed from two or more parts. The separation between the outer legs may be adjustable, and for some uses it may be desirable that the legs move together before, during or after recovery of the sleeve in order that ease of installation be combined with tight sealing. For simple branch-offs between two substrates, the outer legs and the bridge portion may constitute a u-shaped member, whereas for more complex branch-offs more than two outer legs and/or more than one inner leg may be provided. Where the clip is formed from two or more parts, it may be assembled sequentially on the end of the sleeve, as disclosed for example in UK Patent publication No. 2079072, equivalent to U.S. Pat. No. 4,413,922.

The gap between the outer legs will depend on the amount of sealing material to be supplied and on the thickness of sleeve which it has to retain. In general, the gap between the sealing material and each outer leg should be substantially equal to the thickness of the recoverable sleeve. A close fit will help hold the clip in place during installation, and will result in a better seal. The outer legs of the clip may converge towards their distal ends since this will prevent the clip from milking-off the end of the sleeve once it has been properly installed.

Further means may be provided to prevent milking-off. For example the bridge portion of the sleeve may extend for a short distance between the outer legs into the sleeve, and a recess be provided between this extension and each outer leg into which the sleeve may become trapped on recovery. The sealing material in this case is fixed to the extension.

The sealing material may for example be a sealant such as a mastic or an adhesive such as a hot-melt adhesive. The sealing material is heat-activatable, conveniently by melting or softening, although curing or other reactive systems may be used. Preferred hot-melt adhesives include those based on polyamides and on EVA copolymers.

The activation temperature (by which we mean the lowest temperature at which the sealing material is able to bond and/or to be deformed by the sleeve on recovery) should of course be no higher than the temperature attainable by the electrical heater means, and will generally correspond to the recovery temperature of the sleeve. For recoverable sleeves based on polyethylene recovery temperatures of 110° to 125° C. are typical and the activation temperature of the sealing material should therefore be between such a temperature and the temperature at which the installed product will experience in use. Where activation is an irreversible process, such as curing, the lower temperature limit will not apply. Lower recovery temperatures, such as 70°–80° C. are useful in some circumstances, and this may require selection of a sealing material with a lower activation temperature.

The sealing material may be provided with means for increasing its heat conductivity or for reducing the extent to which it flows on activation. Heat conductivity may be increased by filling the material with a metal powder or mesh. Two or more different materials may be combined in the same clip in order to provide controlled activation or to enhance the performance of the final seal. As an example, the inner leg of the clip may comprise a core of one material surrounded by a coating of another material. The central material may retain its integrity after the outer material has softened or melted, thus allowing good bonding to the substrates and sleeve while retaining some from of heat conduction. Also, the core may be a cheaper material having poorer adhesive properties but able to act simply as a void-filler.

The two different materials may alternatively be arranged end-to-end such that one is adjacent the bridge of the clip and the other extends further into the sleeve. The part at the bridge may be formulated to act as a rigid dam at the end of the sleeve, and the other part formulated to retain some flexibility after installation in order that it be able to fill any residual leak paths between the dam and the substrates or sleeve. This is of advantage where the sleeve is used to form for example a pressurized telecommunications splice case since internal pressure will force the flexible part of the sealing material into the voids that require filling. Where the crutch region to be sealed is large or where an adhesive of low melt viscosity is required, a part of the sealing material adjacent the bridge of the clip may act as a dam (not necessary rigid) merely to prevent the remaining part of the sealing material from flowing away on activation.

The sealing material may be shaped to correspond to the void it has to fill. For example, its sides may be concave in transverse cross-section for close fitting with substrates such as cables.

The assembly of the invention is of particular use in forming splice cases for joints in cables such as telecommunication cables. Such splice cases preferably incorporate a liner which surrounds the splice and over which the sleeve is recovered. The liner provides mechanical protection and may also incorporate heat and/or moisture vapour barriers. The liner preferably has a central portion of larger size and tapered ends to accomodate the differences in size between the cables and the splice joining them.

BRIEF DESCRIPTION OF THE DRAWINGS

The invention is further illustrated with reference to the accompanying drawings, in which.

DESCRIPTION OF EMBODIMENTS OF THE INVENTION

Figure 1:
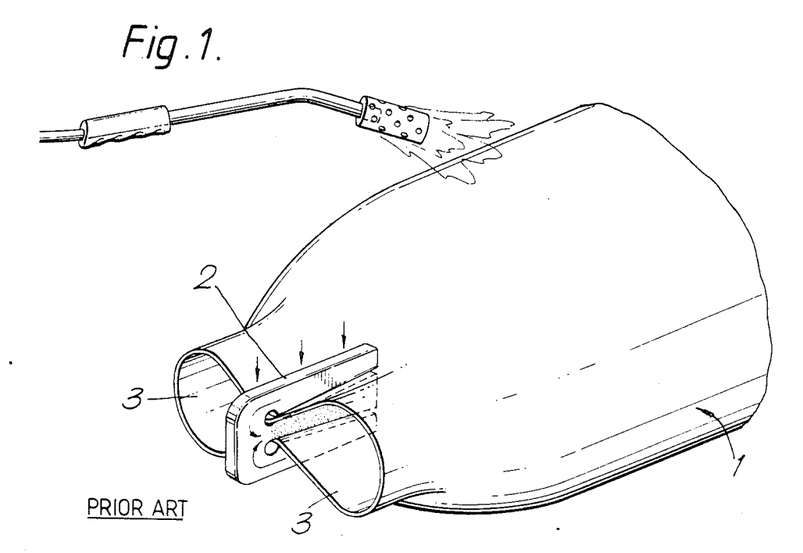
FIG. 1 shows a prior art recoverable sleeve and branch-off clip.

FIG. 1 shows a prior art wrap-around sleeve 1 which is shown being heated by means of a propane torch to cause recovery. The sleeve 1 has a clip 2 at an end thereof forming terminal conduits 3. As indicated by arrows, heat flows by conduction from the outer legs of the clip to an inner leg where an adhesive coating becomes heat-activated.

Figure 2:
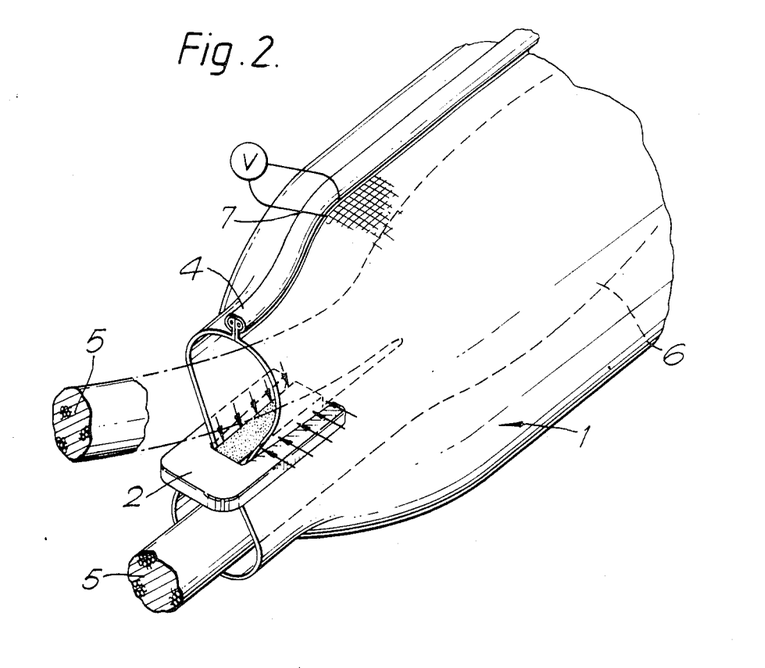
FIG. 2 shows the assembly of the invention.

An embodiment of the invention is show in FIG. 2. The sleeve 1 is formed of an electrically recoverable conductive polymeric material. The sleeve is of wrap-around design, being held closed by closure members 4 and connected to an electrical power supply at 7.

The sleeve 1 is used to encapsulate a branch-off between two cables 5 which are spliced at 6. A clip 2 having an inner leg of sealing material is shown at an end of the sleeve forming two terminal conduits. The arrows show how the internal heating of the sleeve causes a uniform activation of the sealing material. Since the sleeve becomes uniformly hot over its surface there is no danger of the material being activated only at the bridge portion of the clip. The sleeve need not be recoverable over its entire surface. For example, it may be recoverable only at its ends, where sealing around the cables is required; proper activation of the clip sealing material will of course still occur since the area where recoverability is required will in general be precisely that area where the material is situated.

Figure 3A:
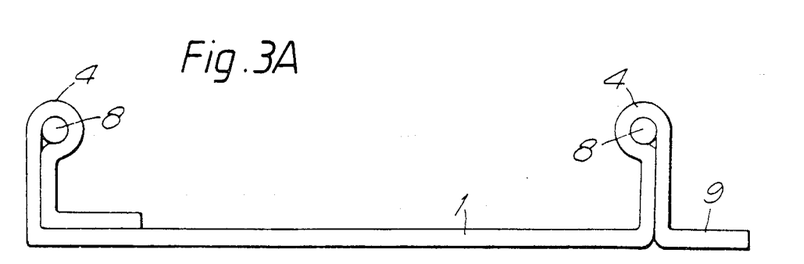
FIGS. 3-7 shows various electrically recoverable sleeves.
Figure 3B:
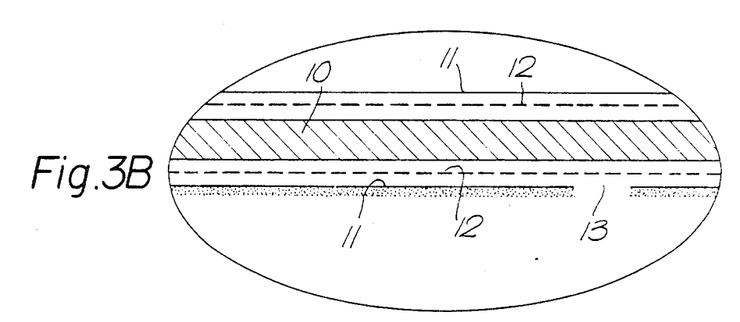

FIG. 3A shows a preferred sleeve for use in the invention, where current is caused to flow through the thickness of the material of the sleeve 1. Closure members 4 contain conductors 8. The closure members are formed by wrapping edge portions of the sleeve around the conductors; both edge portions being wrapped the same way, clockwise as drawn. As a result the conductor 8 at the left-hand side of the sleeve as drawn contacts the upper surface of the sleeve, and the right-hand conductor 8 contacts the lower surface. A portion 9 acts as a sealing flap which underlies the closure members 4 when brought together. FIG. 3B shows how this wrapping around the conductors 8 causes the power to be provided to the conductive polymeric material of the sleeve. The sleeve 1 is a laminate including a central conductive polymer 10, insulations 11, sheet electrodes 12, and an adhesive coating. The insulation 11 (and where appropriate the adhesive) has been removed at a region 13 where the sleeve is to be wrapped around the conductors 8 in order that electrical contact with sheet electrodes 12 be made.

Variations on the arrangement of FIGS. 3A and 3B may be made by incorporating a closure channel (which holds together the members 4) as part of the electrical circuit.

The sleeve as produced or as supplied for use is preferably covered on each side with a layer of insulation as illustrated in FIG. 3B. A strip of insulation should be removed at that place where each conductor 8 or the closure channel is to make electrical contact with the underlying sheet electrode which constitutes part of the laminate sleeve. Provision can be made on the sleeve, for example by lines of weakness, for removal of a strip of insulation across the surface of the sleeve chosen according to the desired position of the closure members and hence the pre-recovery size of the assembled sleeve. If a suitable closure arrangement is chosen the sleeve can be cut to length and closure members can be formed in the field. This technique also allows closure members to be arranged at an angle to one another in order to make a conical rather than cylindrical sleeve. Such a sleeve allows substrates to be covered having a transition in cross-sectional size greater than the recovery ratio of the sleeve.

Figure 4:
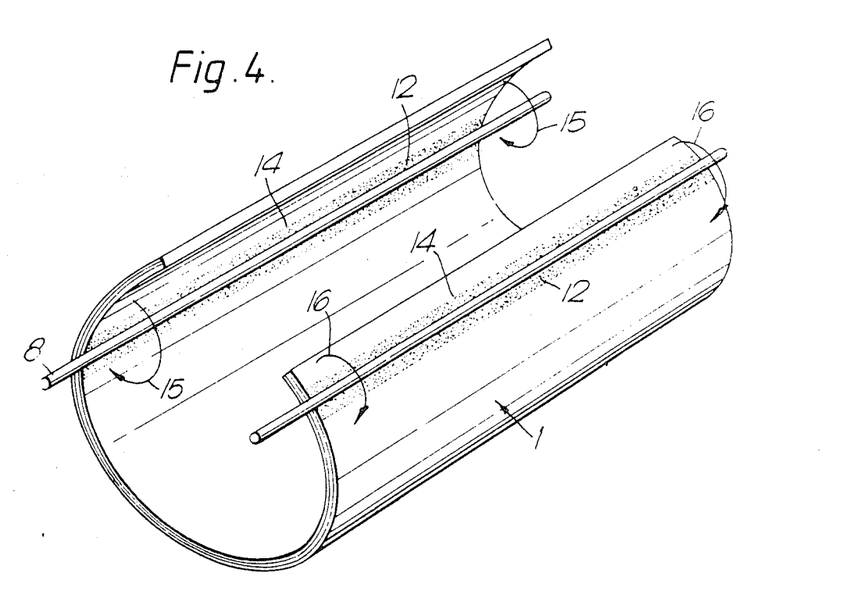

This formation of the closure members is illustrated in FIG. 4. FIG. 4 shows production of a cylindrical sleeve by removal of strips of insulation 14, one from each side of the sleeve, to expose perforate sheet electrodes 12. The edge portions of the sheet are then wrapped around conductors 8 in the directions of the arrows 15 and 16. A conical sleeve may be formed by removing converging strips of insulation. One design of laminate sheet can therefore be used to produce recoverable sleeves of differing sizes and shapes. The shape chosen will depend on the shape of the substrate to be covered in the sense that positioning of the recoverable sleeve is to be facilitated; the sleeve need not generally be produced to match precisely the shape to be covered since this precise matching is achieved by recovery of the sleeve. For example a sleeve designed to cover a termination of a cable to a cylindrical substrate five times the diameter of the cable need not be shaped with a 5X step-shaped transition along its length. A suitable product for sealing this termination would be a sleeve having a 3X recovery ratio and having non-parallel closure members arranged to produce a frusto-conical shape whose small end was half the size of its large end. The overall shape of the sleeve may be trimed to match the position of the closure members, although the sleeve could remain rectangular (when unwrapped) by providing a greater overlap at the smaller end. In all embodiments of the invention, the change in shape that the sleeve must follow as it recovers to seal the substrate will determine the flexibility that the closure members must posses. In general a conductor 8 of wire (single or multistranded) will present no problems. For particularly steep transitions the conductors 8 or the closure members in total may be discontinuous along the length of the sleeve, or be provided with regions of increased flexibility or hinging.

Figure 5:
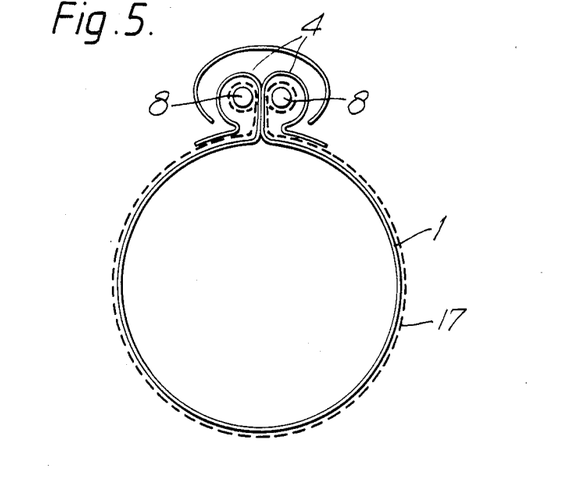

FIG. 5 shows a closure device where a separate heater 17 is used in thermal contact with a sleeve 1. The heater, which is electrically connected to the conductors 8, is formed of a perforate sheet of suitable electrical resistance, or of a laminate comprising a PTC layer and suitable electrodes, optionally with one or more interposed layers of constant wattage material. The sheet if sufficiently perforated will be able to collapse as the sleeve shrinks. It is necessary that sufficient thermal contact with the sleeve be maintained to allow complete recovery, but in general some break-away can occur towards the later stages of recovery. The power need not be supplied in the vicinity of the closure members 4.

Figure 6:
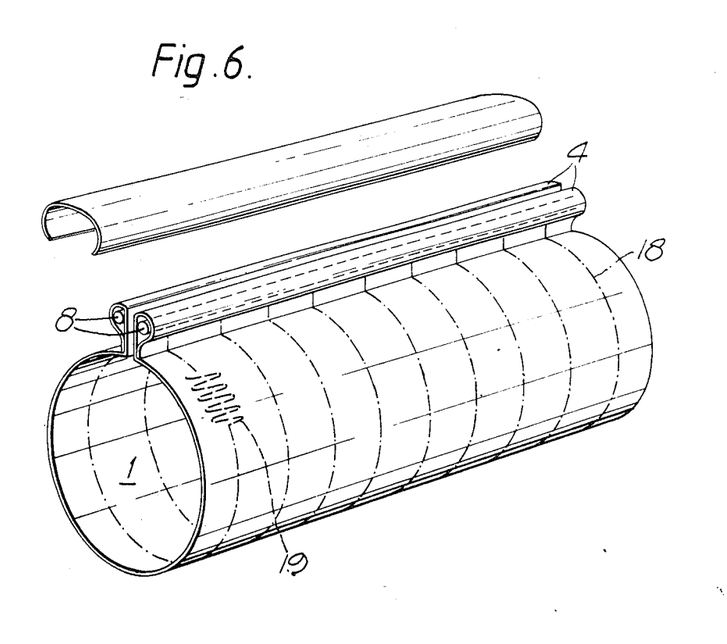

FIG. 6 also illustrates use of a separate heater. Here the heater comprises a series of resistance wires 18 arranged in parallel between the two conductors 8 of the closure members 2 and 3. Other patterns of heating wire may be used, for example a single length of wire connected at one end to one conductor 8, and at the other end to the other conductor 8. In either case it may be preferable that the wire follow a ziz-zag pattern progressing in the direction of recovery since this facilitates collapse of the heater as recovery proceeds. This is shown as 19 in FIG. 6. The heating wires are connected to the conductor 8 for convenience, although power could be supplied in other ways.

Figures 7, 8:
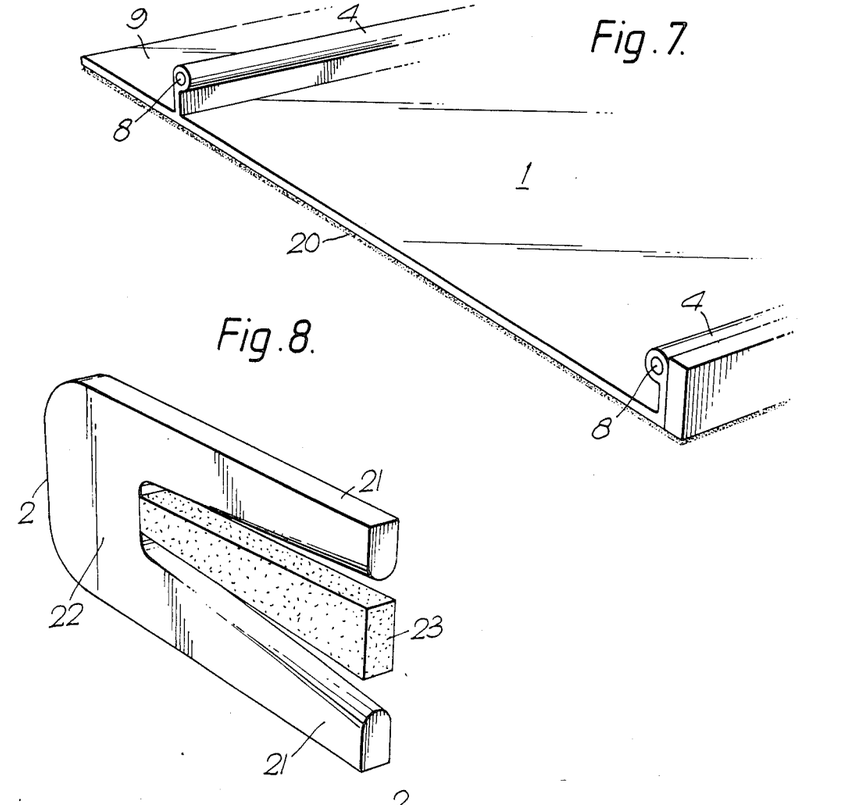
FIGS. 8-12 shows various clips having inner legs of sealing material.

The sleeve 1 in FIG. 7 is arranged for current to flow in the plane of the sleeve from one electrode 8 to the other. Insulation is provided adjacent one closure member 4 to prevent direct current flow from one closure member to the other when the sleeve is in the wrapped configuration. An adhesive coating 20 is also shown. A sealing flap 9 underlies the closure members when installed.

One embodiment of the clip 2 used in the invention is shown in FIG. 8. Two outer legs 21 are connected via a bridge portion 22, and an inner leg 23 of sealing material is bonded to the bridge portion.

Figure 9:
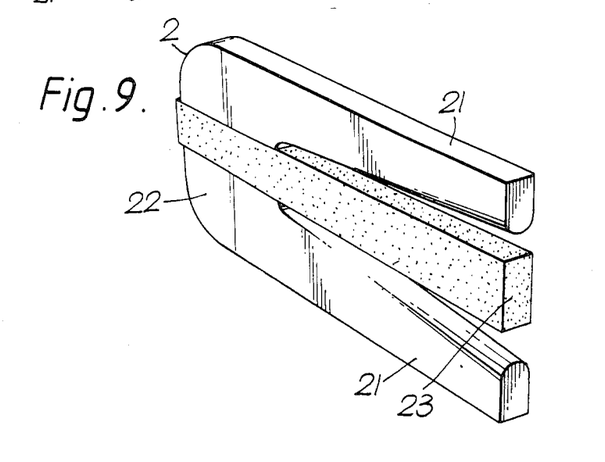

A variation of clip design is shown in FIG. 9 where the inner leg 23 is mechanically held to the bridge portion by being moulded around it.

Figure 10:
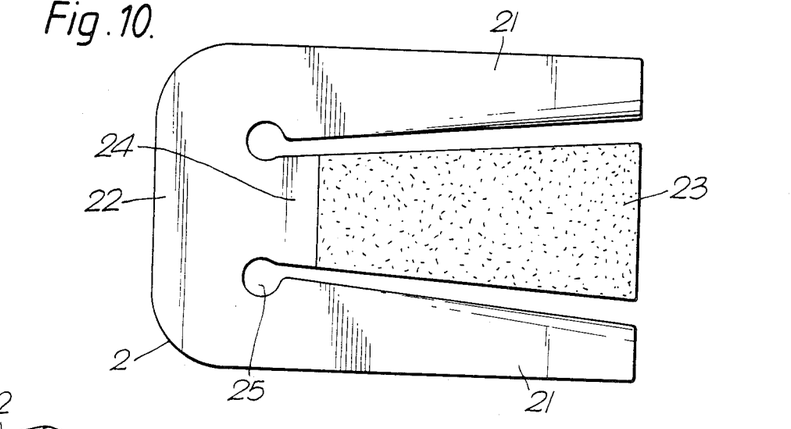

The bridge portion 22 may extend a short distance in the direction of the outer legs to provide an extension 24 to which the sealing material 23 is attached. One advantage of this design is the provision of an anti-milk-off profile 25 within which the ends of the sleeve can thicken on recovery, thus preventing milk-off.

Figure 11:
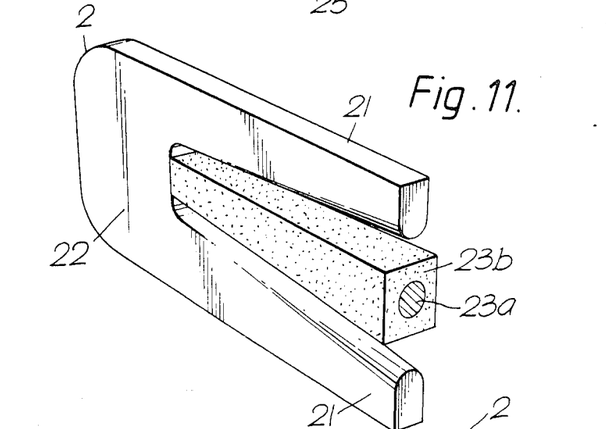
Figure 12:
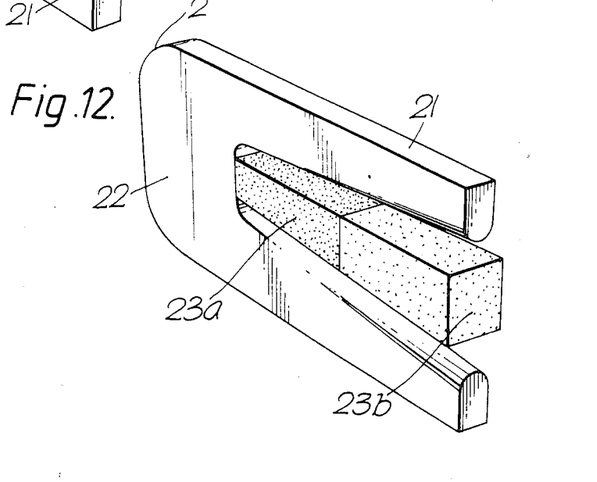

The clip 2 of FIGS. 11 and 12 are provided with inner legs of two components. In FIG. 11 a core 23a of one material is surrounded by a material 23b of a different type. The core can provide some structural integrity or heat-conduction while the outer layer is molten. This can be achieved without the need for, or the disadvantages of, an inner leg of a rigid material integral with the outer legs.

Two different materials 23 are provided end-to-end in FIG. 12. The material 23a near the bridge portion 22 may act as a dam (comprising mastic for example ) and the material 23b may be a hot-melt adhesive that would flow away on melting in the absence of the dam. Alternatively, material 23a may flow to produce a seal at the end of the sleeve but after installation becomes rigid, while material 23b retains some flexibility and acts to block any leak paths between the rigid material and the cables or sleeve. This allows the assembly to withstand high pressure and mechanical movement.

We claim:

1. An assembly for forming a branch-off seal, which comprises:
   an electrically heat-recoverable sleeve;
   a clip which can be positioned at an end of the sleeve so as to form at least two terminal conduits therein, the clip comprising an inner leg of a heat-activatable sealing material and two outer legs; and
   means for connecting the sleeve to a power supply wherein upon the application of an electrical current through the connecting means to the sleeve, the sleeve recovers and the sealing material activates.

2. An assembly according to claim 1, in which the sleeve is a wrap-around sleeve having closure members which can be held together to maintain the sleeve in a wrap-around configuration.

3. An assembly according to claim 2, in which the sleeve is powered through the closure members.

4. An assembly according to claim 1, in which the sleeve has means for heat-regulation.

5. An assembly according to claim 4, in which the sleeve has self-regulating heating means.

6. An assembly according to claim 5, in which the self-regulating heating means comprises a polymeric material having a positive temperature co-efficient of resistance as part of an electrical heating circuit.

7. An assembly according to claim 1, in which the sleeve has self-contained heating means.

8. An assembly according to claim 7, in which the sleeve comprises a conductive polymeric material which self heats when subjected to electrical power.

9. An assembly according to claim 8, in which the conductive polymeric material has a positive temperature coefficient of resistance such that the sleeve exhibits self-regulation of heating.

10. An assembly according to claim 8, in which the sleeve comprises a laminate of a conductive polymeric material between first and second sheet electrodes such that a potential difference between the first and second electrodes causes current to flow substantially perpendicular to the plane of the material of the sleeve.

11. An assembly according to claim 10, in which the sleeve is a wrap-around sleeve having closure members comprising a first elongate conductor adjacent a first edge portion and a second elongate conductor adjacent an opposing edge portion, the first conductor being in electrical contact with the first sheet electrode and the second conductor being in electrical contact with the second sheet electrode.

12. An assembly according to claim 11, in which the first and second closure members are held together by a third closure member which does not form part of the electrical heating circuit.

13. An assembly according to claim 11, in which the first conductor is fixed relative to the first edge portion, and the first and second edge portions are held together by the second conductor.

14. An assembly according to claim 10, in which a layer of electrical insulation substantially covers the outwardly facing surface of each of the first and second sheet electrodes except at a region where electrical contact with respectively first and second conductors occurs.

15. An assembly according to claim 14, in which opposing edge portions of the sleeve are wrapped around elongate conductors, such that the first sheet electrode electrically contacts a first conductor and the second sheet electrode electrically contacts a second conductor; the edge portions and electrodes constituting the closure members.

16. An assembly according to claim 1, having a coating of a heat-activatable adhesive on a surface that is inwardly facing when the sleeve is in a wraparound configuration.

17. An assembly according to claim 1, in which the inner leg comprises a mastic.

* * * * *